United States Patent
Greverie et al.

(10) Patent No.: US 7,859,463 B2
(45) Date of Patent: Dec. 28, 2010

(54) METHOD OF DETECTION IN BISTATIC MODE USING NON-COOPERATIVE PASSIVE RADIO TRANSMISSIONS

(75) Inventors: Wilfried Greverie, Paris (FR); Jean-Philippe Hardange, Gif sur Yvette (FR); Daniel Muller, Chaville (FR); Bernard Olivier, Velizy (FR)

(73) Assignee: Thales (FR)

(*) Notice: Subject to any disclaimer, the term of this patent is extended or adjusted under 35 U.S.C. 154(b) by 472 days.

(21) Appl. No.: 11/816,627

(22) PCT Filed: Jan. 25, 2006

(86) PCT No.: PCT/EP2006/050431
§ 371 (c)(1), (2), (4) Date: Feb. 5, 2008

(87) PCT Pub. No.: WO2006/087257
PCT Pub. Date: Aug. 24, 2006

(65) Prior Publication Data
US 2008/0158061 A1  Jul. 3, 2008

(30) Foreign Application Priority Data
Feb. 18, 2005  (FR)  ................... 05 01695

(51) Int. Cl.
*G01S 3/02* (2006.01)
(52) U.S. Cl. ..................................... 342/453
(58) Field of Classification Search ........... 342/73–114, 342/450–465
See application file for complete search history.

(56) References Cited

U.S. PATENT DOCUMENTS

| | | | |
|---|---|---|---|
| 5,252,980 A * | 10/1993 | Gray et al. | 342/59 |
| 5,760,743 A | 6/1998 | Law et al. | |
| 6,930,638 B2 * | 8/2005 | Lloyd et al. | 342/453 |
| 2003/0020653 A1 | 1/2003 | Baugh et al. | |
| 2004/0075605 A1 | 4/2004 | Bradford et al. | |

FOREIGN PATENT DOCUMENTS

FR  2776438  9/1999

* cited by examiner

*Primary Examiner*—Thomas H. Tarcza
*Assistant Examiner*—Nga X Nguyen
(74) *Attorney, Agent, or Firm*—Lowe Hauptman Ham & Berner, LLP

(57) ABSTRACT

The invention relates to the field of electromagnetic detection systems operating in bistatic mode, in particular to UHF/VHF bistatic radars. The method according to the invention consists in the simultaneous use of signals transmitted by one or more transmitting sources on separate frequency channels. The method includes a step of multichannel reception and separating channels. Additionally, the method includes a step of analysis of the signals received channel by channel, wherein the analysis is performed by correlation of the signals received with copies of the time and frequency shifted reference signals. The reference signals are constituted by the signals received from transmitting sources by direct transmission with a step of integration of the signals analysed, channel by channel, and a step of detection. The method according to the invention enables a signal to be used whose band-width is equal to the band covered by the set of channels used, which improves the contrast and distance resolution of the system implementing said method compared with the systems known from prior art.

13 Claims, 4 Drawing Sheets

METHOD OF DETECTION IN BISTATIC MODE USING NON-COOPERATIVE PASSIVE RADIO TRANSMISSIONS

CROSS - REFERENCE TO RELATED APPLICATIONS

The present Application is based on International Application No. PCT/EP2006/050431, filed Jan. 25, 2006, which in turn corresponds to France Application No. 0501695, filed Feb. 18, 2005 and priority is hereby claimed under 35 USC §119 based on these applications. Each of these applications are hereby incorporated by reference in their entirety into the present application.

FIELD OF THE INVENTION

The invention relates to radio detection systems using non-cooperative transmissions for detecting and locating targets. Said non-cooperative transmissions are for example transmissions intended for radio broadcasting, such as FM radio transmissions. The invention relates in particular to bistatic passive radars operating in the UHF or VHF bands.

BACKGROUND OF THE INVENTION

Passive location of moving targets using reflections on a target of a non-cooperative transmission follows a known principle based on bistatic operation of the location device. Said bistatic mode of operation assumes in particular the use of at least two reception paths, one path termed the reference path, receiving the signal transmitted by the non-cooperative source along a direct route, and a target path, intended for the reception of echoes reflected by elements located in the space covered by the transmitting source.

Passive location in bistatic mode is facilitated if the position of the transmitting source is known. This is why such systems generally use civil transmission infrastructures intended for example for national or regional radio broadcasting, such as FM radio transmissions intended for the general public. Said infrastructures generally further offer the advantage of uniformly covering a vast territory with fixed installations. In a known way, the techniques of passive location of moving targets using reflections on these targets of a non-cooperative transmission with a "random" spectrum such as for example FM transmissions, generally implement the following operations:

- Calculation of the intercorrelation function between the reference signal originating from the direct route of the wave transmitted towards the receiver, and the signal received by the location system after reflection by the target. To do this, the reference signal successively undergoes a series of shifts corresponding to assumptions of time and frequency shifting of the signal corresponding to assumptions regarding the position and velocity of the target that has reflected the signal transmitted by the source.
- Detection of intercorrelation "peaks", said detection being for example carried out by comparison with a threshold.
- Estimation of bistatic distance and Doppler velocity by extracting the position of the detected peaks.

It should be reminded here that the bistatic distance is a distance that can be used to locate the target that has reflected the transmitted signal, on an ellipsoid centred on the transmitting source and the detection system.

However, the implementation of said techniques known from prior art places certain limitations, associated in particular with the nature of the transmissions used. The characteristics of the type of signal transmitted actually have a decisive influence on the detection performance that may be expected from the passive system using the transmitted non-cooperative signal.

In the particular case of FM radio broadcasting transmissions, particular account must be taken of the breakdown of the complete FM band, which typically extends from 87.5 MHz to 108 MHz, in a certain number of separate channels, each channel thus having a limited frequency band, of the order of 200 kHz for example. The use of a transmission channel therefore limits the analysis band of the signal received to a few hundred kilohertz.

In the case of an FM transmission, account must also be taken of the diversity of the transmitted data constituting the signal modulating the carrier. Said data range from simple speech to digital data, possibly coded and multiplexed. The type of modulating signal directly conditions the spectrum width of the signal transmitted within the same channel. Thus the transmitted signal may occupy a frequency band varying from a few hundred Hertz to the whole bandwidth allocated to the channel (typically 200 kHz), for example.

As far as electromagnetic location systems are concerned, it is known that distance resolution is conditioned by the spectrum width of the signal used. Thus, in the case of passive systems using non-cooperative FM transmissions transmitted on a given channel, the distance resolution is limited to several hundred metres, taking into account the maximum width of the FM channel (typically 100 kHz).

Furthermore, it is also known that the contrast between 2 targets or between a target and ambient clutter is limited by the BT product of the signal's band-width B by the integration time T of the measurement made on the signal. Taking into account the band-width of the signal used, which is limited by the channel width and the maximum period of observation, determined by the dynamic characteristics of the type of target sought, we find that this dynamic range is reduced to a value of the order of 40 to 50 decibels. This value considerably limits the dynamic range of the detectable targets, in terms of radar cross section or RCS and detection range, and may induce heavy constraints on the relative geometric arrangement of the transmitter and receiver.

The band-width limitation of the signal transmitted by non-cooperative sources of the FM radio broadcasting station type therefore forms a limitation on the implementation of passive detection systems using the FM band.

SUMMARY OF THE INVENTION

One aim of the invention is to remedy the aforesaid drawbacks, especially with regard to the limitations affecting the performances, in particular in terms of RES and range, of passive detection systems using non-cooperative transmissions. To this end, the subject of the invention is a method of detection for passive location systems, using transmissions in bistatic mode originating from non-cooperative sources transmitting simultaneously on several separate frequency channels.

According to the invention, the method comprises at least the following steps:

- a step of reception for each channel used by the reference signal originating from the transmitting source along a direct route, and by the signal reflected by the different objects present in the space covered,
- a filtering step for separating and selecting the frequency channels used, a step of analysis of the signal received in each channel, channel by channel, which is used to define a set of analysis cells, each cell corresponding to a bistatic distance—Doppler velocity domain, $(\Delta d, \Delta v_d)$, around a point defined by a given pair of values (bistatic distance, Doppler velocity), the measurement of the signal received for said cell being associated with this cell, a step of coherent integration of the signal received, said integration being performed channel by channel for each of the defined cells, a step of detection by comparison with a threshold level of signal received for each cell.

According to the invention, the preceding steps can be advantageously completed by a step of ambiguity management for removing distance secondary lobes of the signal corresponding to a detected object.

The method according to the invention offers the advantage of increasing the dynamic range of detection of the signals received.

The integration of the different channels used by the transmitting source can also be used to improve the signal-to-noise or signal-to-clutter ratio and to make the quality of the location carried out fairly insensitive to band-width variations of the signals received in each channel, variation resulting from a change in nature of the modulating signal at uncontrolled instants, in one or more channels used. This integration can also be used to improve the distance resolution of the method.

The ambiguity management step thus advantageously enables the removal of erroneous detections not corresponding to the actual position of the target.

According to a variant implementation corresponding to a system using a multipath antenna of the DBF type for example, the method also comprises a step of focusing the signal received via the different reception paths of the antenna. Advantageously, the focusing can be performed before or after the distance-Doppler correlation.

According to another variant implementation, the step of detection is carried out separately for each channel before the step of coherent integration.

BRIEF DESCRIPTION OF THE DRAWINGS

Other characteristics and advantages will appear clearly in the course of the description that follows, made referring to the accompanying figures which show.

DETAILED DESCRIPTION OF THE DRAWINGS

Figure 1:
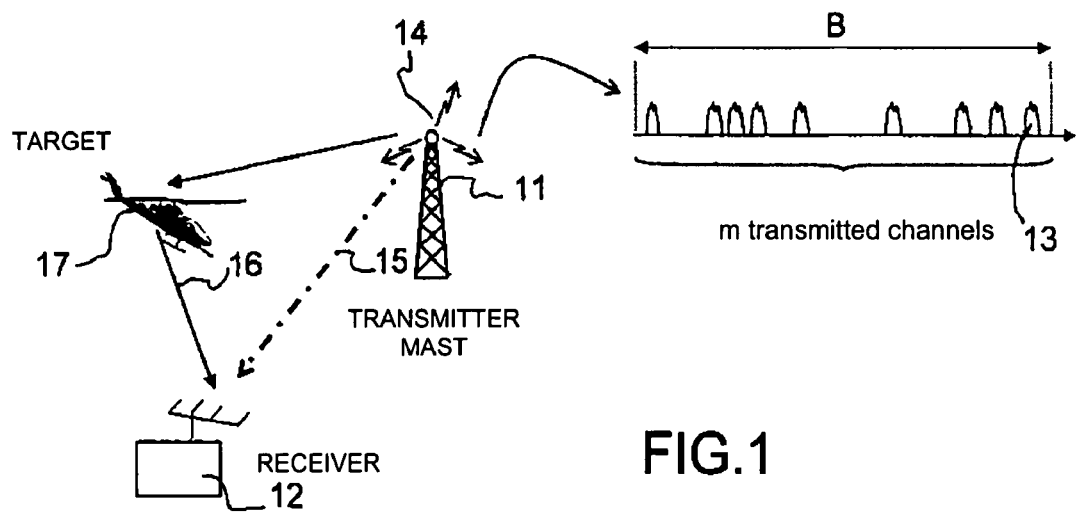
FIG. 1, an illustration of the principle of passive radio detection in bistatic mode, FIG. 2, an illustration of the operating steps of the method according to the invention, FIG. 3, an illustration of the step of coherent integration according to the invention, FIG. 4, an illustration of the result obtained by implementation of the removal of ambiguity step according to the invention, FIG. 5, an illustration of the removal of ambiguity step according to the invention, FIG. 6, an illustration of a variant implementation of the method according to the invention.

As shown in FIG. 1, passive detection in bistatic mode brings into play two separate entities, the transmitting source 11 on the one hand and the detection and location system 12 on the other.

The transmission source 11 is regarded as non-cooperative in that it transmits signals whose destination and nature are not linked to the use that is made of them by the detection system. They are, for example, as mentioned previously, FM band radio broadcasting signals intended for broadcasting general public transmissions. This can also be television type UHF or VHF broadcasting signals for example or any other transmission for general use. It is even possible to conceive that the source 11 is actually a plurality of sources, each source transmitting on one or more channels.

In the rest of the document the case of using a transmission in the FM band will be taken as a non-restrictive example of applying the method according to the invention.

One characteristic of said non-cooperative transmissions is that they generally occur in a defined band of frequencies broken down into separate sub-bands still referred to as channels. For a given geographical region, each channel is allocated to a particular use, corresponding to a given type of transmission. For example, in the case of a source intended for broadcasting FM transmissions, the frequency band B on which this source is liable to transmit extends from 87.5 MHz to 108 MHz and is broken down into channels 13 with a width of the order of 100 kHz. Within the band B all or part of the channels can be used.

Each channel used may be further intended for one or more uses such as broadcasting spoken transmissions, music, images or multiplexed digital data.

Thus the band-width of the FM signal transmitted on each of the channels 13 is separate from that of the signals transmitted on the other channels and may vary over time according to the signal or the information broadcast. For this reason, the transmitting source 11 is qualified as non-cooperative and random.

The detection system 12 takes advantage of said transmitting source by implementing a bistatic detection method that consists in separately performing direct reception of the signal 14 transmitted by the source 11, and reception of the waves reflected by the different objects present in the area covered by the detection system 12. In general, for reasons of ease of implementation, said reception is limited to only one of the channels transmitted by the source. This is because the signals transmitted on the different channels are not necessarily synchronous with one another and their simultaneous use requires having suitable processing.

The signal 15 received directly from the transmitting source, is used as a reference by the detection system 12 for determining the time difference with respect to said reference, presented by the signal 16 reflected to the system by an object 17. After processing, said difference can be used to determine the distance of the object, the speed of the object 17 being further determined in a conventional way by Doppler processing.

According to the type of system used, separate reception of the two signals 15 and 16 can be achieved by using a directional reference antenna, oriented in the direction of the source or not and a measuring antenna aimed as required in a given direction. In the case where the detection system 12 is equipped with a multibeam antenna, of the digital beam-forming (DBF) type for example, separate reception of the reference signal and the measuring signal can be handled by the same antenna by forming reception paths in the appropriate directions.

Unlike passive detection systems operating in the FM band and known from prior art, the systems 12 implementing the method according to the invention are advantageously capable of using the signals transmitted by the transmitting source 11 simultaneously on the different channels used.

Figure 2:
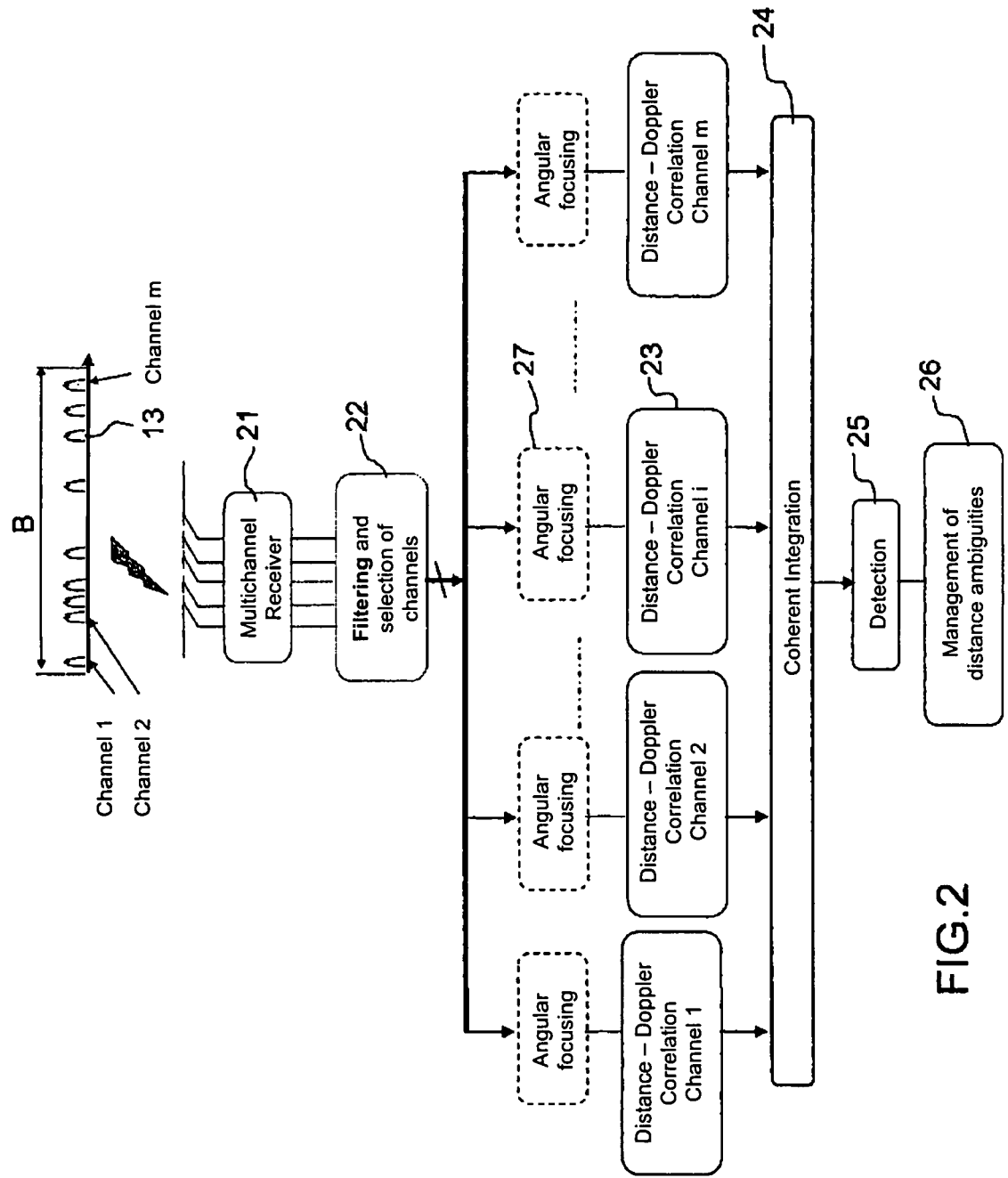

FIG. 2 shows an illustration of the main steps of the method according to the invention.

As the figure illustrates, the method of detection according to the invention is applied to the signals originating from the receiver 21 with which the detection and location system 12 is equipped. As has been previously said, according to the architecture of the system 12, the receiver 21 may consist of a set of two receivers one of which is associated with the reference antenna and the other with the measuring antenna. It may also be, as in the example shown in FIG. 2, a multipath receiver associated with a multibeam antenna. The signal received by the detection system 12 is composed of a set of signals originating, directly or after reflexion, from signals transmitted by the source 11 on each of the m channels 13, used in the whole FM band B.

The method according to the invention comprises a step 22 of filtering the signal received. The main purpose of this filtering operation is to separate by channel the signals received. Accordingly, step 22 consists in implementing selective band-pass filters, whose band-width is of the order of 200 kHz, the size of the band allocated to an FM channel. The band-pass filtering can be achieved in various known ways moreover, not detailed in this document. In the case of a multipath receiver, operation 22 is carried out for each of the reception paths.

In the case where the method according to the invention is implemented in a system comprising a multibeam receiving antenna, the filtering step 22 is associated with a conventional focusing step 27.

The method according to the invention also comprises a step 23 consisting in performing an operation for each channel, of a distance-Doppler correlation of the signal received in the direction of measurement considered with the reference signal corresponding to the same channel. The processing performed during this step consists in conventionally carrying out operations of correlating the signal received with altered copies of the reference signal, the alterations consisting in the reference signal being modified by a variable time shift and a variable frequency shift. The measuring signal correlation operation $Sc_{(i, \theta)}(t)$ with a copy of the reference signal $S_{(i, reference\ path)}(t)$ presenting a time shift $\tau$ and a frequency shift f, can be described in a known way by the following relationship:

$$\chi_{(i,\theta)}(\tau, f) = \int_T Sc_{(i,\theta)}(t) \cdot S^*_{(i, reference\ path)}(t - \tau) \cdot e^{j2\pi f t} \cdot dt \quad [1]$$

where i represents the number of the FM channel considered and $\theta$ the direction of the analysed path (case of a system comprising a multibeam antenna).

T represents the integration time of the measurement. This time is generally a function of the time during which it is possible to consider that the measurement is not distorted by the movement of the objects located in the space covered.

In the particular case where the detection and location system 12 is equipped with a conventional single beam antenna, the preceding relationship becomes:

$$\chi_{(i)}(\tau, f) = \int_T Sc_{(i)}(t) \cdot S^*_{(i, reference\ path)}(t - \tau) \cdot e^{j2\pi f t} \cdot dt \quad [2]$$

This correlation operation is generally carried out for sampled values of $\tau$ and f, $\tau$ varying from $\tau=0$ to a value $\tau=\tau_{max}$ by increments of $\Delta\tau$ and f varying from $-f_{max}$ to $+f_{max}$ by increments of $\Delta f$.

The values $\tau_{max}$ and $f_{max}$ are defined based on the characteristics of desired range and Doppler velocity of the objects that are wanted to be detected. As for the values of $\Delta\tau$ and $\Delta f$, they are determined by the accuracy limits that can be obtained allowing for the band-width allocated to a channel and the observation time T that may be available. Thus, the minimum value of $\Delta\tau$ is limited by the inverse $1/\Delta F$ of the band $\Delta F$ allocated to each channel i, while, typically, the minimum value of $\Delta f$ is limited by the inverse $1/T$ of the observation time.

Implementation of the operation described by the formulae [1] and [2] can be used to determine, for a signal received at a given instant, the delay $\tau$ and frequency shift f values for which a correlation peak is obtained between the measuring signal and the delayed reference signal. A correlation peak is obtained when an object 17 located at a given distance from the detection system 12 and moving at a given velocity vd, reflects the wave transmitted by the source 11 towards the system.

The delay $\tau$ further enables the corresponding bistatic distance d to be directly determined, this bistatic distance being used to locate the object 17 considered on an ellipsoid having the transmitting source 11 and the detection system 12 as foci. The location of the actual position of the object 17 is itself obtained by determining the direction pointed at by the reception path or the measuring antenna.

The value f of the frequency shift for which a correlation peak is obtained corresponds to the Doppler frequency of the signal reflected by the object 17 and is directly linked to the Doppler velocity Vd of the object 17, with respect to the detection system 12.

The moduli $|\chi_{(i, \theta)}(\tau, f)|^2$ or $|\chi_i(\tau, f)|^2$ of the functions $\chi_{(i, \theta)}(\tau, f)$ or $\chi_i(\tau, f)$ are representative of the ambiguity functions of each of the channels, for the direction $\theta$ in the case of a system comprising a path-forming antenna or for the measuring path in the case of a single-beam antenna, respectively. Said ambiguity function defines the size of the elementary analysis cell ($\Delta d, \Delta v_d$) of the signal obtained by distance-Doppler correlation.

Figure 3:
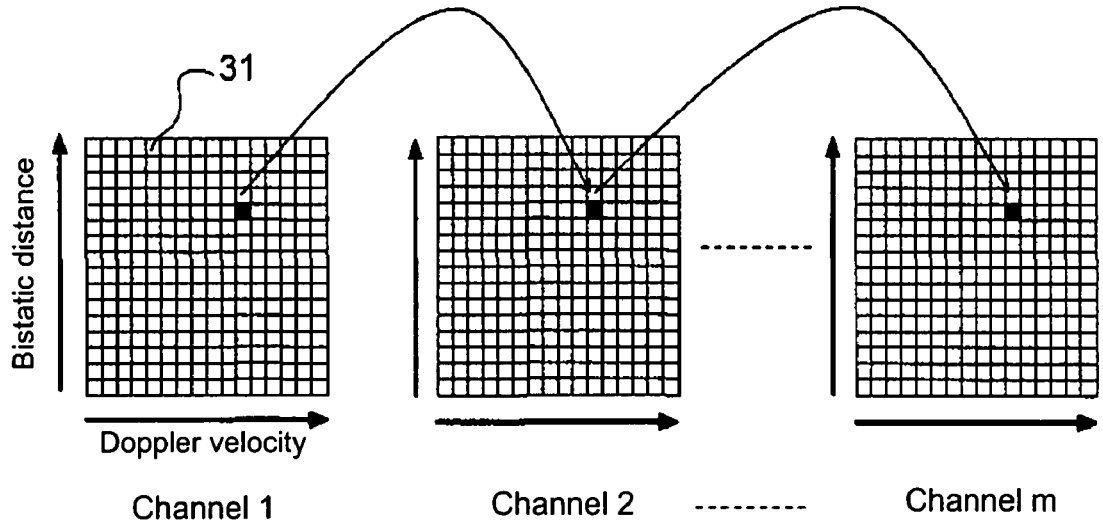

The step of Doppler-distance correlation can be advantageously used to establish for each of the transmission channels 13, a two-dimensional representation of the analysis of the shifts undergone by the reflected signal. This representation in a plane consists of analysis cells juxtaposed along an axis representing the time shift values $\tau$ and an axis representing the frequency shift values f, each cell having the dimension $\Delta\tau\cdot\Delta f$ (or $\Delta d\cdot\Delta v_d$). As shown in FIG. 3, this representation or "panorama" consists of a set of boxes 31 each corresponding to an analysis cell of the signal received by correlation with a copy of the transmitted signal. Each cell is associated with the result of the corresponding correlation operation. This mapping style of representation has the advantage of facilitating the association of the results obtained simultaneously for different channels.

The general aim of the processing carried out in step 23 is to establish a distance-Doppler mapping of the signal received on the measuring path. It is presented here, by way of a non-restrictive example of embodiment, as processing by correlation of the reflected signal with a reference signal. Within the context of the invention, other methods for obtaining this mapping are, of course, conceivable.

As shown in FIG. 3, the distance-Doppler mapping forming the object of the mapping step 23 can be used to locate the signal received at a given instant in a specified bistatic distance-Doppler velocity cell, corresponding to the ambiguity functions $|\chi_{(i, \theta)}(\tau, f)|^2$ or $|\chi_i(\tau, f)|^2$. Accordingly, in order to increase the contrast and improve the distance resolution, the method according to the invention comprises an additional step 24 of coherent integration, channel by channel, of the signal obtained in each of the analysis cells 31.

According to the invention, the processing carried out during step 24 consists for example in calculating, for the values of I between 0 and m−1, the value of the signal $X_m$ described by the following relationship:

$$X_1 = \frac{1}{m} \sum_{i=1}^{m} \chi_{i,\theta}(\tau, v_d) \cdot e^{j2\pi \frac{f_i}{F_s} \cdot \frac{1}{m}} + \varphi_i \quad [3]$$

In the relationship [3], $f_i$ represents the frequency of the channel i considered and $F_s$ the sampling frequency of the signal received. The variable $v_d$ represents the Doppler velocity of the target, i.e. of the object that has reflected the signal transmitted by the source.

The integration operation 24, described by the relationship [3] amounts to performing, for each pair of values ($\tau$, $v_d$), the integration of the signal processed on m coherent samples, originating from m channels, in order to increase the contrast and the distance resolution.

The term $\phi_i$ is a phase correction term ensuring coherence from transmitter to transmitter between the signals originating from different channels. The values $\phi_i$ are obtained by an optimization of the signal-to-noise ratio at the processing output. Said optimization is based on a "least squares" type of algorithm.

Figure 4:
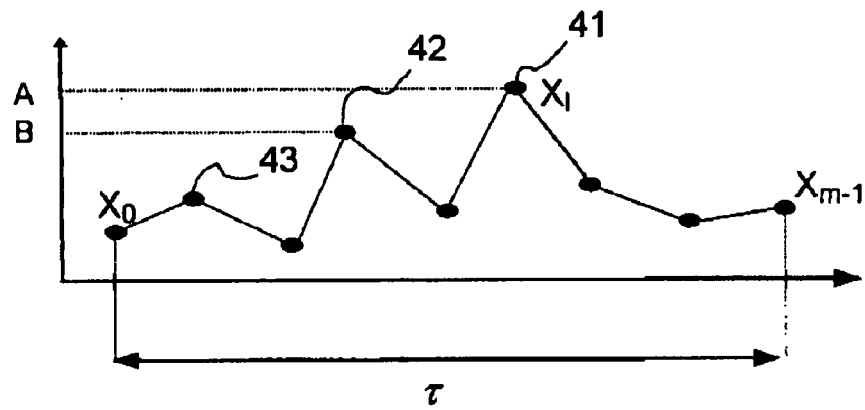

At the completion of step 24 the signal present in an analysis cell ($\tau$, $v_d$) is therefore made up as shown in FIG. 4 of a series of m distance samples revealing a main peak 41 and secondary peaks 42-43 distributed over the period $\Delta\tau$ equivalent to the bistatic distance interval $\Delta d$ of an analysis cell ($\Delta d$, $\Delta v_d$). The position of the main peak 41 thus can be advantageously used to determine the precise position of the target present in the analysis cell considered.

The integration step 24 is conventionally followed by a detection step 25. The purpose of this step is to determine for each analysis cell whether the signal associated with said cell has a sufficient amplitude for corresponding to a target of interest. In a known way, this step generally consists in comparing the level of the signal associated with the cell considered with a threshold. Within the context of the method according to the invention, the integration of the signals originating from the different channels used can be advantageously used to achieve a gain in integration which facilitates this detection step.

According to the characteristics of the target and the frequency of the channels considered, for a target detected in a given analysis cell, after integration a signal will be obtained showing a main peak 41 of given amplitude A and secondary peaks whose amplitude may be very small compared to A or very close to A and so be capable of causing an ambiguity regarding the position of the target between the position corresponding to the main peak and that corresponding to the secondary peak.

In the latter case, it is difficult to remove the ambiguity by simple methods such as comparing different peaks in relation to a detection threshold. This is why the method according to the invention shown in FIG. 2 may comprise, in addition to a conventional step of detection 25 by a CFAR (constant false alarm rate) estimator for example, an additional step 26 of removal of distance ambiguity. This additional step is illustrated in FIG. 5.

After detection, the distance response may reveal high level secondary lobes 42 according to the frequency distribution of the m channels used. To eliminate said secondary lobes, at step 26 a processing is carried out consisting in choosing several combinations of n channels from the m available channels and implementing the coherent processing of step 24 on the distance-Doppler cells where targets have been detected.

For each analysis cell considered, the processing of step 24 is then applied to step 26 using m samples, including the samples corresponding to the n chosen channels, the samples corresponding to unused channels being replaced by arbitrary values, e.g. zeros. The processing of step 24 can thus be applied to different combinations of n channels.

Figure 5:
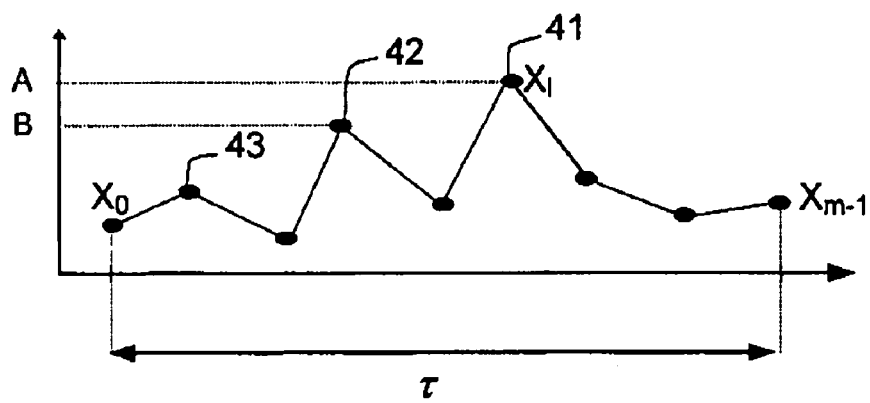
Figure 5:
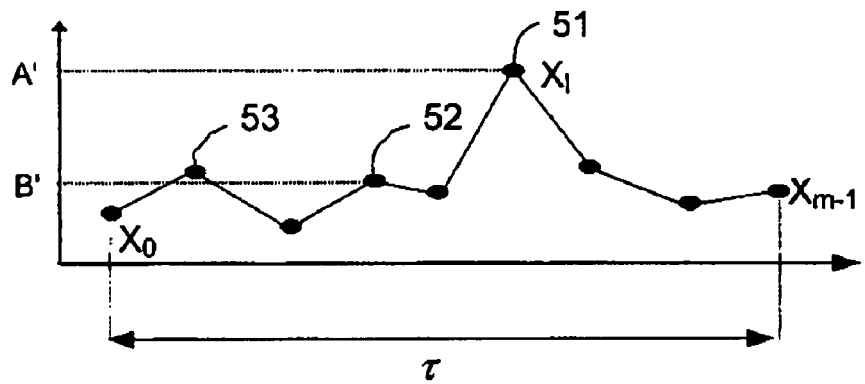

This use of different combinations of n out of m channels advantageously has the benefit, as shown in FIG. 5, of varying the amplitude of the secondary peaks 52-53 according to the n channels selected, the main peak always remaining the peak of maximum amplitude. Thus, by comparing the results obtained during steps 24 and 26, it is possible to determine the position of the main peak and thereby that of the target, whilst eliminating the secondary lobes.

Figure 6:
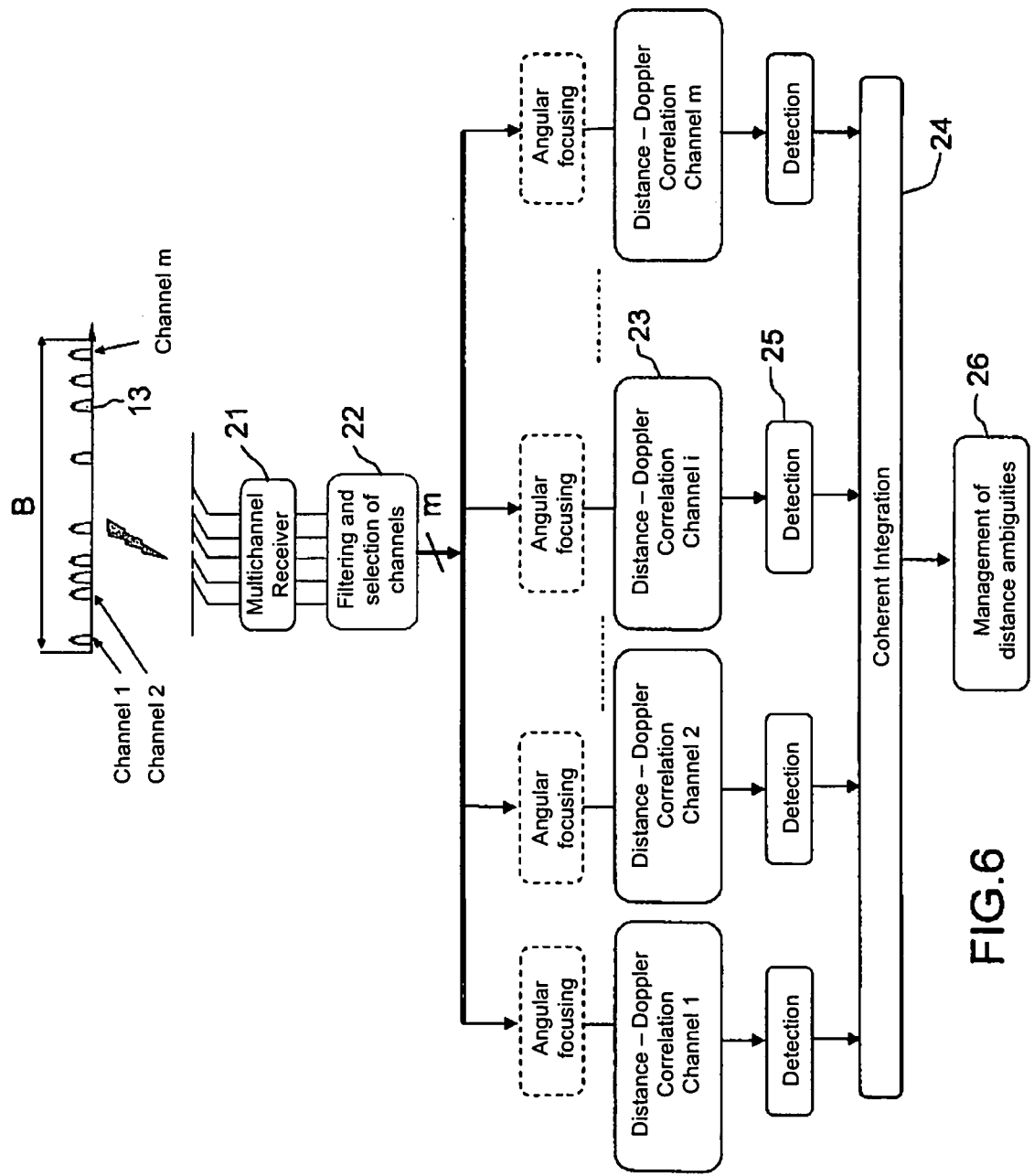

The method shown in FIG. 3 constitutes a particular form of implementation of the method according to the invention presented by way of illustration. This form of implementation is, of course, not restrictive and may have variants. One possible variant implementation is particularly illustrated by FIG. 6. This variant implementation, in which the detection step 25 precedes the coherent integration step, has the advantage of limiting the integration operation just to distance-Doppler cells in which a target is detected. Thus the number of operations performed during step 24 is limited.

As mentioned previously, the method according to the invention is based on the simultaneous use of signals transmitted by the source on different channels and on the coherent integration of the information extracted from the signals originating from different channels. By virtue of the simultaneous use associated with the different processing implemented, in particular coherent integration, the method according to the invention has the advantage of increasing the contrast between targets or between target and clutter.

Analysis of the ambiguity function of an FM radio transmission actually shows that the secondary lobes of the signal have a level equal to the level of the main lobe multiplied by the factor 1/TB, T being the period of observation of the signal and B the band of the transmitted signal.

According to the number m of channels used, multichannel operation such as that implemented by the invention will bring about an improvement in the main lobe/secondary lobes contrast in a ratio equal to the ratio of the bands used (equivalent multichannel band/single channel band). Thus, by considering a ratio equal to 100, 20 dB is gained in contrast.

Advantageously, the method according to the invention also enables an improvement in distance resolution compared to that obtained when only a single channel transmitted by the transmitting source is used. In this connection it should be reminded that distance separating power is the property of detecting two targets close to one another, whose received echoes have the same intensity. It is further shown that separating power is, in general, given by the ratio c/B in which B is the difference in frequency between the extreme channels forming the set of channels used. Thus, for two transmissions 20 MHz apart, a distance resolution of 15 meters can be expected.

The method according to the invention also offers the advantage of enabling implementation of the ambiguity removal step by a process of channel selection.

The invention claimed is:

1. A method of detecting a target by bistatic radar detection using non-cooperative radio signals transmitted by a transmitter, the radio signals corresponding to a plurality of frequency channels, the method comprising:
   receiving, by a receiver positioned away from the transmitter, a received signal including reference signals derived from a portion of the radio signals originating from the transmitter along a direct route and reflected signals derived from another portion of the radio signals reflected by the target;
   filtering the received signal to obtain a corresponding reference signal and a corresponding reflected signal for each one of the frequency channels;
   analysing, for each one of the frequency channels, the corresponding reflected signal and the corresponding reference signal to identify a cell in a bistatic distance —Doppler velocity domain and to assign a signal value to the cell, the bistatic distance —Doppler velocity domain being divided into a plurality of cells, and each one of the plurality of cells corresponding to a region having a predetermined distance interval $\Delta d$ and a predetermined velocity interval $\Delta v_d$ around a point defined by a bistatic distance and a Doppler velocity;
   for at least one cell of the plurality of cells, performing coherent integration of signal values for the frequency channels assigned to the at least one cells and assigning an integration result to the at least one cell;
   identifying a bistatic distance defined within the at least one cell for the target when the integration result assigned to the at least one cell exceeding a threshold level.

2. The method according to claim 1, wherein the analysing the corresponding reflected signal and the corresponding reference signal comprising performing a distance-Doppler correlation $\chi_{i,\theta}(\tau, f)$ of a reflected signal $Sc_{(i,\theta)}(t)$ corresponding to a frequency channel i of m frequency channels with copies of a corresponding reference signal modified by time shift ($\tau$) and frequency shift (f) corresponding to a Doppler velocity $V_d$, said correlation being defined, for a given direction $\theta$, by the following relationship:

$$\chi_{(i,\theta)}(\tau, f) = \int_T Sc_{(i,\theta)}(t) \cdot S^*_{(i, reference\ path)}(t - \tau) \cdot e^{j2\pi ft} \cdot dt$$

where T represents a integration time of the reflected signal $Sc_{(i,\theta)}(t)$.

3. The method according to claim 2, wherein the performing coherent integration comprising, for the at least one cell, the integration result comprising m different distance samples inside the distance interval defined by the cell, and each of the m different distance samples $X_1$ being defined by the following relationship:

$$X_1 = \frac{1}{m} \sum_{i=1}^{m} \chi_{i,\theta}(\tau, v_d) \cdot e^{j2\pi \frac{f_i}{F_s} \cdot \frac{1}{m}} + \varphi_i$$

where I represents a variable varying from 0 to m-1, $f_i$ represents the frequency of a frequency channel i considered, $F_s$ represents the sampling frequency of the received signal, $v_d$ represents the Doppler velocity of the target, and $\varphi_i$ is a phase correction term.

4. The method according to claim 3, further comprising managing distance ambiguity if more than one distance sample exceeds the threshold value.

5. The method according to claim 1, further comprising identifying a cell in which the bistatic distance of the target likely falls after the performing of coherent integration.

6. The method according to claim 1, further comprising identifying a cell in which the bistatic distance of the target likely falls before the performing coherent integration.

7. The method according to claim 2, further comprising identifying a cell in which the bistatic distance of the target likely falls after the performing coherent integration.

8. The method according to claim 3, further comprising identifying a cell in which the bistatic distance of the target likely falls after the performing coherent integration.

9. The method according to claim 4, further comprising identifying a cell in which the bistatic distance of the target likely falls after the performing coherent integration.

10. The method according to claim 2, further comprising identifying a cell in which the bistatic distance of the target likely falls before the performing coherent integration.

11. The method according to claim 3, further comprising identifying a cell in which the bistatic distance of the target likely falls before the performing coherent integration.

12. The method according to claim 4, further comprising identifying a cell in which the bistatic distance of the target likely falls before the performing coherent integration, and the managing distance ambiguity being performed only on the identified cell that the target has been detected.

13. The method according to claim 3, wherein the identifying the bistatic distance comprising:
   comparing the value of each of the m distance samples with the threshold level; and
   using a distance corresponding to one of the distance samples as the bistatic distance for the target if the one of the distance samples has a value exceeding the threshold level.

* * * * *